United States Patent [19] [11] 3,908,931
Fundingsland [45] Sept. 30, 1975

[54] TAPE AND FILM CARTRIDGE DRIVE MEANS

[76] Inventor: John O. Fundingsland, 1126 N. Sheridan, Colorado Springs, Colo. 80909

[22] Filed: Aug. 22, 1973

[21] Appl. No.: 390,389

[52] U.S. Cl. .................................... 242/199; 352/72
[51] Int. Cl.$^2$ .................. G03B 1/04; G11B 15/32; G11B 23/04
[58] Field of Search .................... 242/192, 197–200, 242/210; 274/4 C, 11 C; 352/72; 179/100.2 Z

[56] References Cited

UNITED STATES PATENTS

| | | | |
|---|---|---|---|
| 2,919,866 | 1/1960 | Minott, Jr. | 242/192 |
| 3,017,803 | 1/1962 | Sakaki | 242/199 X |
| 3,145,941 | 8/1964 | Proctor | 242/192 |
| 3,250,482 | 5/1966 | Whitnah | 242/197 |
| 3,258,215 | 6/1966 | Ono | 242/197 |
| 3,532,293 | 10/1970 | Rose | 242/200 |

*Primary Examiner*—Leonard D. Christian
*Attorney, Agent, or Firm*—Richard W. Hanes

[57] ABSTRACT

The present invention relates to apparatus for winding and reeling webs of indefinite length and of relative narrow width such as magnet tape and motion picture film, and more specifically, a cartridge comprising a housing and a pair of spaced apart mutually parallel spindles supported rigidly by the housing, and where a pair of hubs are rotatably mounted on the spindles, each hub being driven by a selectively positioned drive wheel which is inserted into the cartridge and contacts one or the other of the hubs, depending on which direction winding is desired.

4 Claims, 10 Drawing Figures

TAPE AND FILM CARTRIDGE DRIVE MEANS

Cartridges and cassettes for containing a length of tape or film which is wound on take-up and supply reels are well established in the prior art. Such devices of the prior art, however, require that each of the two reels in the cartridge be driven by separate drive shafts which are provided as part of the play-back, recording or projection machine. Consequently, as the cassette or cartridge is placed on or in the play-back machine, the hubs of each reel in the cartridge must be made to receive the driven spindles of the play-back machine. The cartridge therefor must be laid flat onto the player and cannot be inserted endwise. This limitation is severely restrictive to the design of play-back or projection equipmemt.

This disadvantage is sought to be overcome by the present invention where it is the more specific object and purpose to provide a simplified bi-directional drive mechanism for such cartridges where the hubs or reels are engaged by a single drive wheel which is part of the play-back device and which is inserted into the cartridge through an access slot in the center thereof and between the hubs or reels.

Another object of the invention is to provide a drive mechanism for cartridges of the type described where the dimensions of the cartridge are not limiting factors in play-back equipment; that is to say that because of the universal nature of the interconnection between cartridge and player, the cartridge may be of many different sizes within reasonable limits.

Another related object of the invention is to provide a cartridge for tape or film which requires only a capstan and a single driving connection to the play-back machine which is positioned in the center of the cartridge between the rotable hubs which carry the web either as a take up or supply spool.

Other and further objects and advantages of the invention will be apparent from a reading of the following description of a preferred form of the invention and a second embodiment thereof taken in connection with the accompanying drawings in which.

Figure 1:
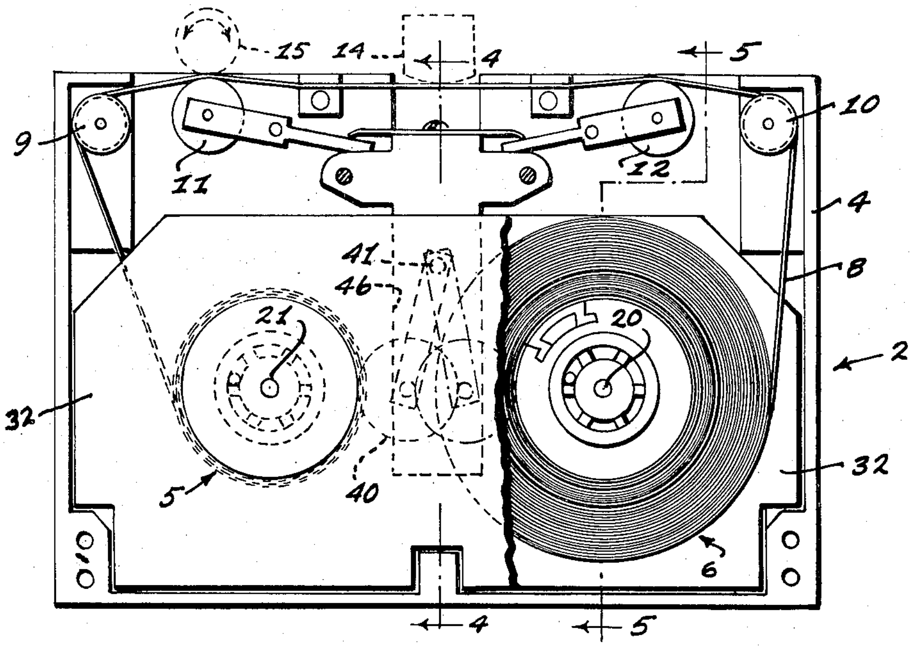
FIG. 1 is a side elevational view of a preferred form of the cartridge of the present invention with a portion of the housing thereof broken away to reveal a portion of one reel for winding tape thereon.
Figure 2:
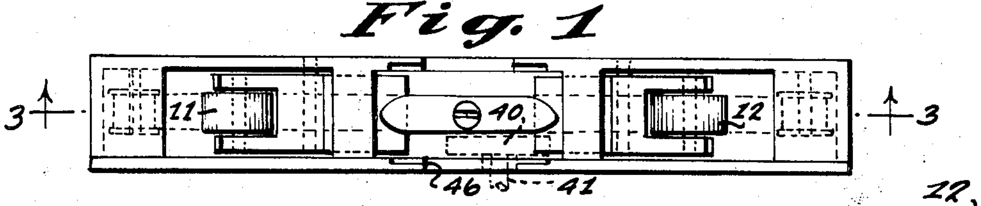
FIG. 2 is a top plan view of the cartridge shown in FIG. 1.
Figure 4:
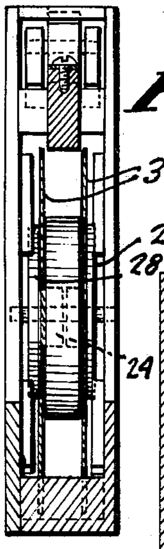
FIG. 4 is a cross-sectional view taken along lines 4—4 of FIG. 1.

A magnetic tape cartridge 2 (FIG. 1) comprises a housing 4 having sides and end portions in which is disposed two reels (generally indicated as 5 and 6) for winding and reeling a length of magnetic tape 8. Included in the housing are idler pulleys 9 and 10 around which the magnetic tape 8 is directed and also two spaced apart spring biased pressure rollers 11 and 12 against which the capstan 15 bears. The pressure roller 11 provides a back up to the tape 8 in one playing position of the cartridge while the pressure roller 12 provides the back up when the catridge is turned over to play the other half of the tape. The play back head 14 contacts the tape through an opening in the top of the cartridge. Rigidly mounted in the back side 18 of the housing 4 are a pair of spaced apart spindles 20 and 21. Rotatably disposed on each of the spindles are hubs 23 and 24. Each of the hubs 23 and 24 may include upper and lower flanges 25 and 26, and 27 and 28, respectively. Surrounding each of the hubs at a clearance distance from the periphery of the flanges 25, 26, 27 and 28 are a plurality of raised ribs 30 integral with the sides 18 and 31 of the housing 4. The ribs, radially disposed around the spindles 20 and 21, give support to a thin sheet of material 32 which acts as a guide and support for the tape 8 as it reels onto the hub.

Provision is made for the use of an adapter hub or outer hub 35 which is carried by the central or inner hub 23. The inner hub 23 and the adapter hub 35 may be interconnected by any one of several well known means, such as a pin 37 interconnecting the flanges of the inner hubs and the adapter hub.

It will be obvious from an examination of the structure just described that the use of the tape support sheet 32 can provide for accommodation of a greater amount of tape in a given size cartridge because there is no problem of the interference of rigid flanges such as when two reels having rigid relatively large radius flanges integral therewith are employed in the same catridge. With the structure of the present invention, one reel can accommodate an amount of tape which would be impossible to accommodate with reels having rigid flanges.

The primary advantage of the construction of the cartridge of the present invention is seen in the ability to drive the take-up reel from a central location. A drive wheel 40 shown in FIG. 1 in dashed lines is rotatably driven through a mechanism in the playback device at 41 so that when the wheel is being driven in one directon, the play-back apparatus pivots or swings the drive wheel so that its periphery is brought into driving contact with the periphery of the lower flange 25 or 27 of one of the reels 6 or 5. When it is desired to drive the tape in the opposite direction, the drive wheel 40 is reversed in its direction of rotation and simultaneously swung through a narrow angle about pivot point 41 so that its periphery comes into driving contact with the flange of the other reel. The lower flange of the reel with which the drive wheel comes into contact is the take-up reel, turning the reel so that the tape is being pulled from the other reel (supply reel). A more complete description of a play-back apparatus having a pivotal drive wheel or drive gear can be found in my co-pending application for U.S. Letters Patent, Ser. No. 275,692 filed July 27, 1972, and entitled Apparatus for Intermittent Feeding of Strip Material.

Figure 5:
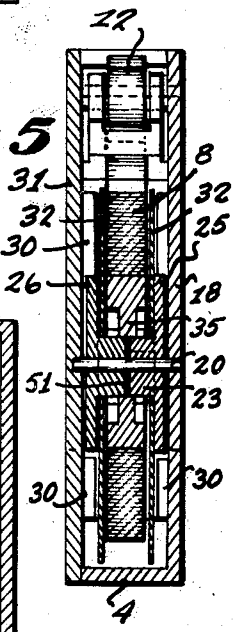
FIG. 5 is a cross-sectional view taken along lines 5—5 of FIG. 1.
Figure 3:
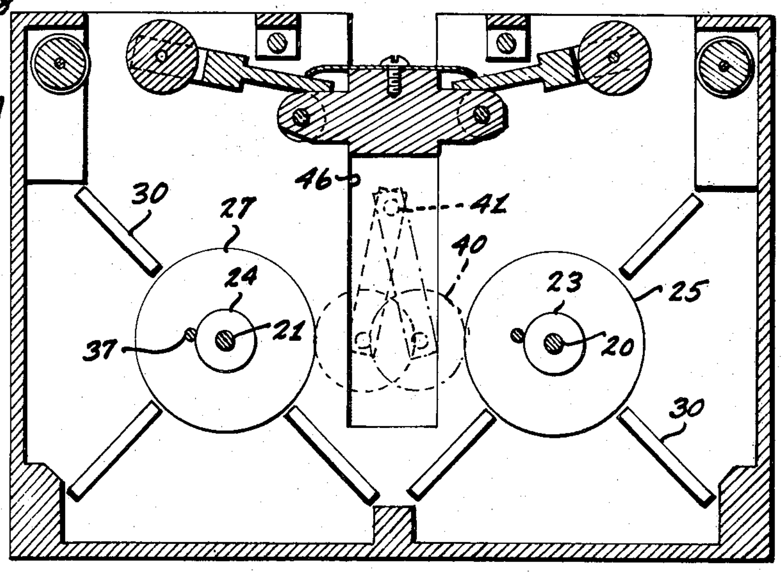
FIG. 3 is a cross-sectional view of the preferred form of cartridge taken along lines 3—3 of FIG. 2.
Figure 6:
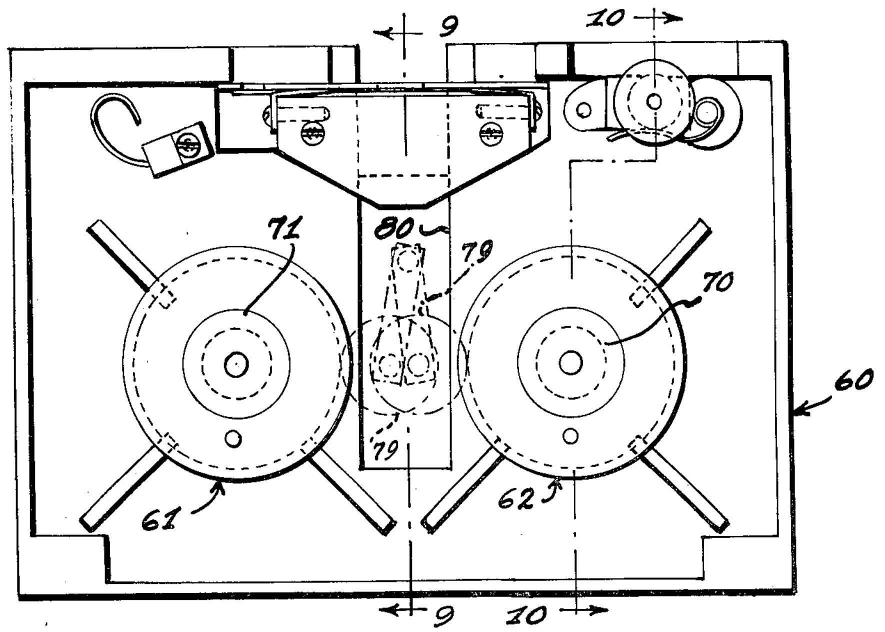
FIG. 6 is a side elevational view of a second embodiment of the present invention.
Figures 7, 8, 9, 10:
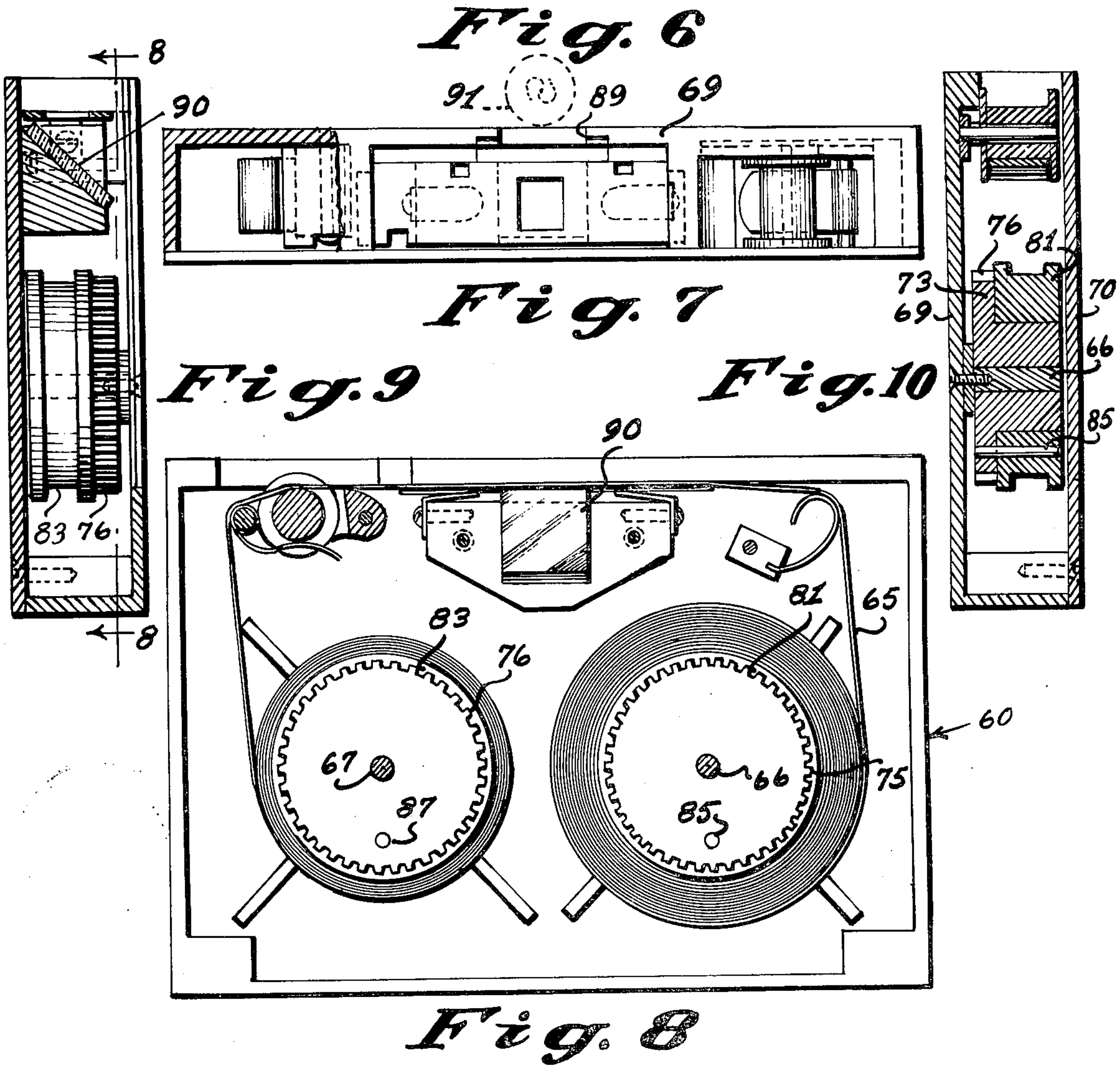
FIG. 7 is a top plan view thereof.
FIG. 8 is a cross-sectional view taken along lines 8—8 of FIG. 9.
FIG. 9 is a cross-sectional view taken along lines 9—9 of FIG. 6.
FIG. 10 is a cross-sectional view taken along lines 10—10 of FIG. 6.

It will be noted that the drive wheel 40, when pressed against the flange of one of the hubs in driving engagement, represents an asymmetric load to the hub. Since the shaft 20 and the hub 23, for example, are not precisely matched and the hub is not inteded to be equipped with bearings, the clearance between the hub and the shaft allows the hub to cock on the shaft when the asymmetric load is applied. The cocking is not significant from the standpoint of being able to freely rotate the hub, but does become significant from the standpoint of winding tape. When a quantity of tape is wound on the cocked hub, the edge of the tape roll becomes angulated to the retainer sheet 32 and, in due course, starts interferring with it causing obvious undesired difficulties. The problem is overcome, however, by splitting the hub perpendicular to its axis at a point midway between the flanges of the hub. The split hub arrangement is shown by reference number 51 in FIG. 5. The split hub allows only a part of the hub to be cocked by the side loading of the drive wheel while allowing the other half of the hub and its flanges to assume a normal position on the shaft. By providing ample and generous clearances between the split hub and the adapter hub 35, the latter will effectively "float" on the hub and will assume a self-aligned position wherein the periphery of the adapter hub 35 will be parallel to the surface of the tape 8 as the tape comes off the idler pulley 9 or 10. When the adpater hub 35 is free to assume such an attitude, the tape will be wound thereon so that the edge of the tape roll will be substantially parallel to the surface of the retainer sheet 32.

In order to permit the "plug-in" type of insertion of the cartridge of the present invention, the sides 18 and 31 of the cartridge housing are provided with access slots 46 which provide clearance for the entry of the pivotal shaft 41.

A second embodiment of the cartridge of the present invention is shown in FIGS. 6 through 10 and is particularly adapted to wind and reel motion picture film.

The cartridge 60 comprises side and end walls and contains two hubs (generally indicated by reference numerals 61 and 62) mounted therein for the winding and reeling of motion picture film 65. Similar to the preferred embodiments, this apparatus includes a pair of spaced apart spindles 67 and 66 which are rigidly mounted onto the side 69 of the case 60. Rotatably mounted on each of the spindles 66 and 67 are inner hubs 70 and 71. Each of the hubs 70 and 71 contains a lower flange 73 around the periphery of which are mounted ring gears 75 and 76, which gears engage a drive gear 79 which operates in a similar fashion to the friction drive wheel 40 of the preferred embodiment. The side 69 of the case 60 is provided with an opening 80 which accommodates the shaft of the drive gear 79 as the cartridge is inserted into the play-back mechanism.

Adapter hubs 81 and 83 are mounted on the inner hubs 70 and 71 and may be of any appropriate size in order to accommodate the film which is to be wound thereon within the cartridge. The adapter hub is connected to the inner hub for rotation therewith by pins 85 and 87.

The film cartridge includes a mirror 90 which directs light energy from a source 91 after it has passed through the film to additional optical systems for projection of the film image.

I claim:

1. A cartridge for the winding and storage of tape comprising:

a housing having sides;

a pair of spaced apart mutually parallel fixed spindles carried by one of the sides of the housing and perpendicular thereto;

a hub mounted for rotation on each of said spindles;

first drive means concentric with each of said spindles and fixedly attached to each of said hubs disposed and adapted to engage second drive means disposed exteriorly of the cartridge, said first drive means comprising, a flange integral with the hub, the plane of which is perpendicular to the spindle, the periphery of said flange having means for driving engagement with said second drive means; and a second hub concentric with the first hub and mounted for rotation therewith.

2. A cartridge for the winding and storage of tape comprising:

a housing having sides;

a pair of spaced apart mutually parallel fixed spindles carried by one of the sides of the housing and perpendicular thereto;

a hub mounted for rotation on each of said spindles, wherein the hub is split perpendicularly to its axis of rotation;

frist drive means concentric with each of said spindles and fixedly attached to each of said hubs disposed and adapted to engage second drive means disposed exteriorly of the cartridge, said first drive means comprising, a flange integral with the hub, the plane of which is perpendicular to the spindle, the periphery of said flange having means for driving engagement with said drive means.

3. Apparatus for winding and reeling strip material of indefinite length comprising:

a base member having two spaced apart mutually parallel spindles fixed thereto;

take-up and supply hubs, respectively, each rotatably mounted on one of said spindles;

first drive means concentrically and fixedly attached to each of said hubs;

second drive means disposed intermediate the said spindles and adapted to selectively engage the first drive means on one of the hubs; and an outer hub mounted concentrically on the said take-up and supply hubs for rotation therewith, wherein the take-up and supply hubs are split in a plane substantially perpendicular to the spindle.

4. The combination of claim 3 and further including spaced apart retainer means surrounding each of said spindles and disposed bi-laterally of the said outer hub.

* * * * *